Oct. 11, 1955  E. K. JONES ET AL  2,720,447
CONTACTING APPARATUS
Filed Dec. 29, 1951
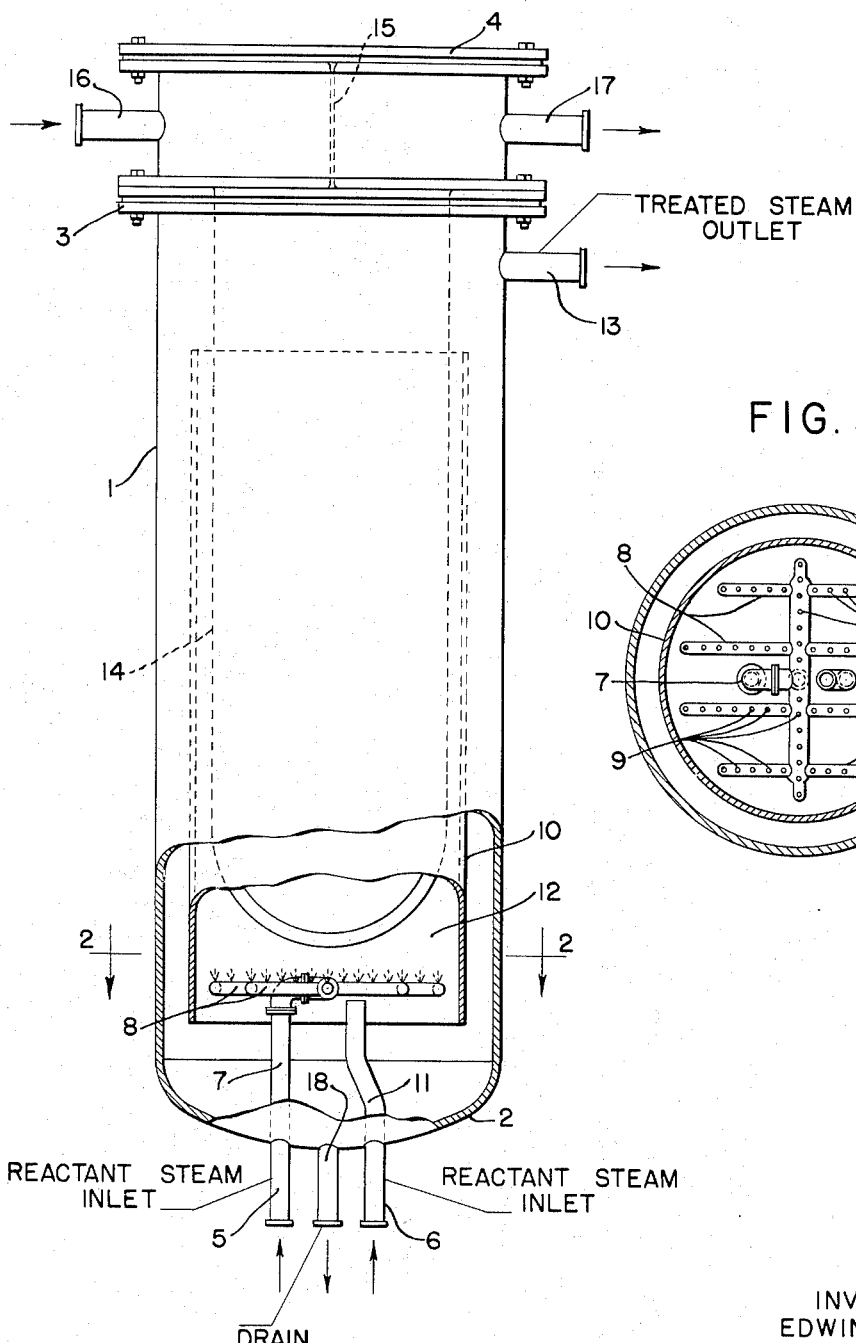
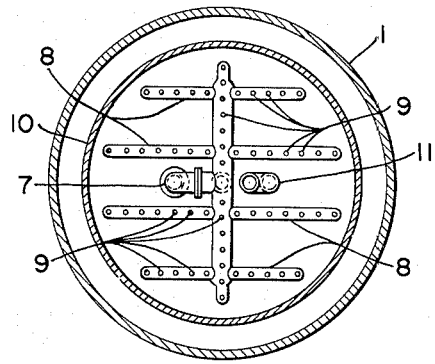
INVENTORS:
EDWIN K. JONES
JAMES E. GANTT
BY:
Chester J. Giuliani
Philip T. Liggett
ATTORNEYS:

United States Patent Office 2,720,447
Patented Oct. 11, 1955

2,720,447

CONTACTING APPARATUS

Edwin K. Jones, Evanston, and James E. Gantt, Elmwood Park, Ill., assignors to Universal Oil Products Company, Chicago, Ill., a corporation of Delaware Application December 29, 1951, Serial No. 264,221

3 Claims. (Cl. 23—285)

This invention relates to an improved type of contacting apparatus particularly adapted for mixing and contacting liquid streams for conversion or treating purposes.

There are, of course, various types of contactors and reactors which are suitable for mixing fluid streams which may be either miscible or immiscible. Such contacting apparatus may incorporate flow mixing means, or alternatively, propellers, impeller wheels, or like mechanical means, to effect the mixing. However, most contacting apparatus do not provide temperature control means, or combine construction and design features, as does the present apparatus, to effect both the uniform mixing of the reactant streams without the necessity of power driven means and temperature control within the reaction section, through indirect heat exchange means. In addition, internal baffling means provides for internal recirculation of at least one fluid stream within the contacting chamber.

One object of the present invention is to provide a simplified construction and arrangement which effects the mixing of reactant streams uniformly across a contact zone having a temperature control means combined therewith.

It is also an object and feature of the invention to provide for contacting immiscible liquid streams and to have an internal skirt or baffle means which permits one of the substantially immiscible liquid mediums to be separated from a product stream and recirculated into the contact section of the apparatus.

Briefly, the present contactor for fluid streams comprises in combination, a vertically disposed confined chamber, a continuous internal baffle positioned substantially concentrically within the chamber and spaced from the interior walls and ends thereof, a fluid inlet conduit connecting with a perforate fluid distributing header in the lower portion of the chamber, said header substantially traversing the area within the continuous internal baffle, a second fluid inlet extending into the interior of the chamber and terminating at the level of the fluid distributing header, a fluid outlet from the upper portion of the chamber, and confined heat exchange means depending from the upper portion of the chamber within the area bounded by the internal baffling means and above the fluid distributing header.

In a preferred arrangement, the heat exchange means incorporates a plurality of heat exchange tubes or a tube bundle connecting with a combined fluid distributing and discharge header in a manner whereby the combined header and the connecting tubes may be bolted or otherwise removably connected to the top of the contacting chamber.

The fluid distributing header which is positioned within the lower portion of the chamber is preferably constructed of a plurality of tubular arms or pipe members each having a plurality of spaced holes, slots, or other perforations along their upper surfaces, so that the reactant fluid may be uniformly dispersed upwardly in the zone confined by the skirt or baffle. The baffle is preferably concentrically positioned within the chamber and spaced from the walls of the latter so that there is a draft-tube action permitting the fluid having the highest specific gravity to settle into the annular zone between the skirt and the chamber wall and to flow downwardly along the outer wall and then upwardly into the central portion, together with the reactant stream being introduced through the fluid distributing header.

Although, not by way of limitation and as noted hereinbefore, the present apparatus is particularly adapted for use in effecting rapid and uniform mixing of reactant streams which are substantially immiscible and of different specific gravities. For example, in the alkylation of hydrocarbons, isoparaffins are reacted with olefins in the presence of a mineral acid catalyst, such as sulfuric acid, hydrofluoric acid or phosphoric acid. The reactants and catalyst are introduced and mixed in a liquid state while at a temperature suitable for conducting the desired reaction. Temperature control is desirable in conducting this reaction in order to minimize the polymerization of the olefinic portion of the reactant stream. It has been found that the polymerization is reduced by conducting the reaction at reduced temperatures, so that it is thus desirable to provide cooling heat exchange means within a contacting apparatus to maintain optimum conversion conditions. Since the hydrocarbons and the acid catalyst are substantially miscible, it is also desirable to provide an apparatus which permits at least a partial separation of these materials prior to discharging a product stream, so that the heavier acid catalyst is maintained in the contacting zone for recirculation into contact with a continuously introduced charge stream.

Reference to the accompanying drawing and the following description thereof will serve to illustrate more clearly the construction and arrangement of one embodiment of the present improved apparatus, as well as set forth additional adantageous features when used with various liquid contacting operations.

Figure 1 of the drawing is an elevational view, of the contacting apparatus.

Figure 2 of the drawing is a sectional plan view of the lower portion of the apparatus, as indicated by the line 2—2 in Figure 1 of the drawing.

Referring now to the drawing, there is shown a pressure-tight external chamber or shell 1 having a closed lower end or head 2, and a flanged upper end 3 which is adapted to hold and connect with a cooling fluid distributing and collecting header 4. The lower end of the chamber 1 and head 2 is provided with two reactant stream inlet nozzles 5 and 6. In this instance, one of the inlet nozzles 5 connects with an internal conduit 7 which in turn connects with a fluid distributing header 8. The latter preferably comprises a plurality of pipes or tubular members which in turn are provided with holes or slots 9, or the like, along the upper surfaces thereof. This header 8 is spaced from the lower end of the chamber 1 and extends across the internal lower portion of a concentric skirt or baffle 10, so that the reactant stream being introduced through inlet 5 and conduit 7 is uniformly distributed across substantially the entire cross-sectional area of the baffled contact zone 12. The second reactant stream inlet nozzle 6 connects with an internal conduit 11 which has an open end terminating at a level substantially the same as that of the fluid distributing header 8. Thus, the fluid stream being introduced through inlet means 6 is discharged into the contacting zone 12 at a level where it mixes with the reactant stream from the header 8, and the resulting mixture, emulsion, or the like, may effect a concurrent upward flow through the internal mixing zone 12 to the upper portion of the contacting chamber 1.

As shown in the drawing, the skirt or baffle member 10 stops short of the upper portion of the chamber 1 so that a resulting contacted product stream may be separated and withdrawn from chamber 1 by way of outlet nozzle 13. In the case of miscible fluid streams, forming a substantially homogeneous mixture, the resulting mixed stream is withdrawn by way of outlet means 13. However, in the case of immiscible and different weight liquids, such as in the case of effecting alkylation of iso-paraffins with an acid catalyst, then there is a separation within the upper portion of the chamber 1 and a heavier acid catalyst tends to remain settled within the skirt member 10 as well as exteriorly thereof and thus flow downwardly along the inside wall of the chamber 1 within the annular space between skirt member 10 and the inside wall of the chamber. It is also to be noted, that where the reactant streams are introduced into the lower portion of the contacting zone 12, that there is a draft-tube type of action causing the heavier acid catalyst within the lower portion of the chamber and within the outer annular zone to be drawn upwardly into the contacting zone 12, in a continuous recirculating type of flow.

It is also a feature of the present combined apparatus to utilize a plurality of tubes in an indirect heat exchange type of tube bank 14, which in turn extends downwardly from the upper portion of the chamber into the contacting zone 12, whereby controlled temperaure conditions may be provided for the continuous contacting of the reactant streams being introduced to the chamber. In the present embodiment, the tube bundle 14 comprises a plurality of U-shaped tubes connecting with and depending from the cooling fluid header 4, which in turn is attached to the flanged head of chamber 1. The fluid distributing header 4 is provided with an intermediate plate or separating means 15 so as to form a cooling fluid inlet zone being supplied with a fluid medium by way of inlet nozzle 16, and a cooling fluid outlet zone having a fluid outlet nozzle 17. Cool water, refrigerant, or other suitable heat exchange stream may be passed through the tube bundle 14 to maintain the desired temperaure conditions within the contacting zone 12. However, the present apparatus may well be used in connection with conversion operations other than alkylation, where it is desirable to provide additional heat to the contacting zone, in which case steam or other relatively hot fluid medium may be passed through the header 4 and the tube bundle 14 to maintain the desired temperature conditions in contacting zone 12.

The present apparatus shown also provides a drain connection 18 from the lower head 2 in order that the fluid mediums may be removed from the contacting apparatus. Minor modifications may of course be made in the design and construction of the improved type of contacting apparatus within the scope of the present invention.

For example, a circular arrangement of perforated tubes or pipes may be made in the fluid distributing header 8, rather than the two-way projection from a central pipe as shown. However, in any case the fluid header 8 is preferably bolted or otherwise removably connected with the internal conduit 7 so that it may be readily installed or replaced from the inside of the apparatus. Also, preferably, such fluid header is constructed, as shown, of spaced pipes or members rather than from a large perforate diaphragm, so that the recirculating fluid stream may pass readily therethrough and upwardly into the contacting zone 12. Various means not shown, may be utilized for supporting the long tube or skirt member 10 so that it is properly spaced from the ends of the chamber 1, as well as from the side wall thereof.

We claim as our invention:

1. A contacting apparatus comprising a vertically disposed shell having a closed lower end and a fluid distributing and collecting header removably attached to its upper end, an open-ended cylindrical baffle positioned concentrically within and spaced from the inner walls of said shell, U-shaped heat exchange tubes depending from said header into the space within said baffle and means for passing heat exchange fluid through the header and tubes, a fluid distributing header traversing the area within the lower portion of said baffle below said heat exchange tubes, an inlet conduit connecting with the last-mentioned header, a second inlet conduit terminating at substantially the level of said last-mentioned header in the space within said baffle, and a fluid outlet from said shell between the first-mentioned header and the top of said baffle.

2. The apparatus of claim 1 further characterized in that the second-mentioned header comprises a plurality of horizontally disposed perforated tubular members.

3. The apparatus of claim 1 further characterized in that the second-mentioned header comprises a central tubular member and a plurality of additional tubular members projecting laterally therefrom, each of said members having a multiplicity of perforations along the upper surface thereof.

References Cited in the file of this patent
UNITED STATES PATENTS

| | | |
|---|---|---|
| 2,289,953 | Aldridge | July 14, 1942 |
| 2,367,351 | Hemminger | Jan. 16, 1945 |
| 2,378,342 | Voorhies et al. | June 12, 1945 |
| 2,584,391 | Leffer | Feb. 5, 1952 |